No. 621,543. Patented Mar. 21, 1899.
H. V. SMITH.
KNIFE.
(Application filed Dec. 22, 1898.)

(No Model.)

Witnesses
A. W. Stipek
P. J. Egan

Inventor
Henry V. Smith
By James Shepard.
Atty.

UNITED STATES PATENT OFFICE.

HENRY V. SMITH, OF HARTFORD, CONNECTICUT, ASSIGNOR OF ONE-HALF TO E. H. SMITH, OF BRIDGEPORT, CONNECTICUT.

KNIFE.

SPECIFICATION forming part of Letters Patent No. 621,543, dated March 21, 1899.

Application filed December 22, 1898. Serial No. 700,001. (No model.)

*To all whom it may concern:*

Be it known that I, HENRY V. SMITH, a citizen of the United States, residing at Hartford, in the county of Hartford and State of Connecticut, have invented certain new and useful Improvements in Knives, of which the following is a specification.

My invention relates to improvements in knives; and the main object of my improvement is to produce a knife with a good steel cutting edge and with a surface of softer metal that will not rust.

Figure 1:
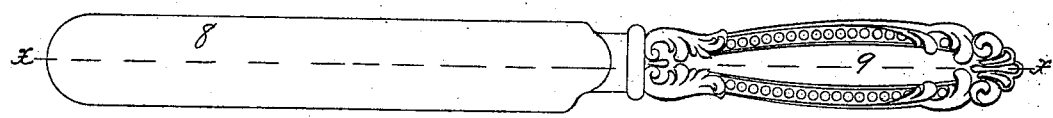
Figure 2:
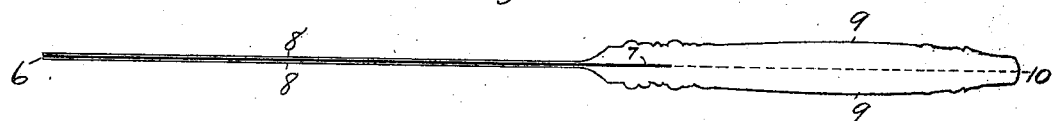
Figure 3:
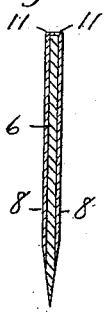
Figure 4:
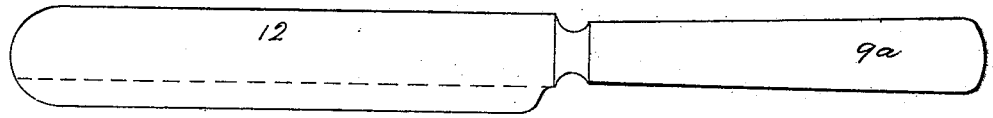

In the accompanying drawings, Figure 1 is a side elevation of my knife. Fig. 2 is a longitudinal section on the line $x$ $x$ of Fig. 1. Fig. 3 is an enlarged transverse section of the blade. Fig. 4 is a side elevation of my knife in a modified form, and Fig. 5 is a transverse section of the blade thereof.

In the construction shown in Figs. 1, 2, and 3, which is a hollow-handled knife, I first make a thin steel blade or blade center 6, with a shank 7 of any desired length, and preferably temper the same and then polish or clean it, so that it may be brazed or soldered. I also make two half handles or shells and blade sides from silver, German silver, brass, or alloy of some soft or non-rusting metal, the same being formed by means of suitable dies, one blade side 8 and half-handle 9 being formed together in one piece of metal to form what I may call a "half-knife." I next place the blade center 6 between the two blade sides 8, with its shank 7 extending in between the half-handles or handle-shells 9, the edges of which shells abut against each other, as indicated by the broken line 10 in Fig. 2. I then unite the parts mechanically by soldering or brazing, soldering not only the abutting edges, but also soldering firmly the blade sides to the blade center. I prefer that the blade center shall not extend through to the back of the blade, and therefore form the back of the blade sides with turned edges 11, which abut against each other, as shown in Fig. 3. In this knife the blade center is mainly relied upon to give the blade the requisite elasticity and strength and cutting edge, while the blade sides are, in effect, veneers to give a neat finish that will not rust.

Figure 5:
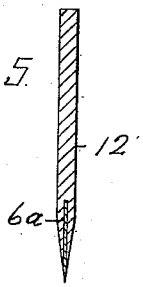

In Figs. 4 and 5 I show a knife with a blade-body 12, of German silver or analogous metal, which may be in one and the same piece with the solid handle $9^a$. The cutting edge of the blade is formed from a thin strip of steel $6^a$, which may be about five-thousandths of an inch in thickness and let into a fine slit at that edge, as shown in the enlarged section, Fig. 5, the same being firmly united to the blade sides, as before described. In this knife the German-silver or other alloy may be rolled down to give the blade the requisite elasticity and to stiffen it, as may be desired, the steel being depended on only to furnish a cutting edge.

In both constructions the edge portion of the blade is composed of a central and inserted strip of steel and two blade sides or veneers of a softer metal mechanically secured thereto, and in both the steel is or may be so thin as to be easily kept sharp or, perhaps, require no sharpening at all.

I claim as my invention—

1. A knife, the edge portion of the blade of which consists of an inserted strip of steel and blade sides on the broad sides of said strip to which they are mechanically secured, substantially as described.

2. A knife consisting of a blade center of steel and two blade sides and handle-shells all mechanically secured together, substantially as described.

HENRY V. SMITH.

Witnesses:
JOHN H. KIRKHAM,
G. ARTHUR HADSELL.